United States Patent [19]

Hellwig et al.

[11] Patent Number: 5,253,141

[45] Date of Patent: Oct. 12, 1993

[54] MODULAR MAINFRAME COMPUTER SYSTEM HAVING AN INTERCONNECTION PORTION IN ASSEMBLY WITH A CPU AND EXTENDING FROM A CABINET

[75] Inventors: Bernard-Edmund Hellwig, Germering; Dieter Schmalzl, Augsburg, both of Fed. Rep. of Germany

[73] Assignee: Siemens Nixdorf Informationssysteme Aktiengesellschaft, Fed. Rep. of Germany

[21] Appl. No.: 840,163

[22] Filed: Feb. 24, 1992

[30] Foreign Application Priority Data

Mar. 21, 1991 [DE] Fed. Rep. of Germany ....... 9103503

[51] Int. Cl.⁵ .......................... H05K 7/10; H05K 5/00; G06F 1/16
[52] U.S. Cl. .................................... 361/683; 361/729; 439/928
[58] Field of Search .......................... 439/928; 200/307; 361/390, 391, 392, 393, 394, 395, 396, 399, 380

[56] References Cited

U.S. PATENT DOCUMENTS

| | | | |
|---|---|---|---|
| 3,443,161 | 5/1969 | King | 361/390 X |
| 4,313,149 | 1/1982 | Hirose et al. | 361/394 |
| 4,423,465 | 12/1983 | Teng-Ching et al. | 361/394 |
| 4,677,524 | 6/1987 | Shiraishi et al. | 200/307 X |
| 4,680,674 | 7/1987 | Moore | 361/395 |

Primary Examiner—Leo P. Picard
Assistant Examiner—Michael W. Phillips
Attorney, Agent, or Firm—Hill, Steadman & Simpson

[57] ABSTRACT

A modular mainframe computer system having functional units separately housed in respective cabinets aligned in at least one row to form one central unit, the central unit having a central processor cabinet at one end of the row in which is housed at least one central processor, the central, processor having an interconnection portion in assembly therewith, the control processor being so positioned at a backside of the central processor cabinet that the interconnection portion projects outwardly from the central processor cabinet perpendicularly to the row thereby leaving a free space within a front interior section of the central processor cabinet within which can be received the interconnect portion of another central processor of another central unit oriented perpendicularly to the control unit of concern. Ultimately, four such central units can be joined in a cruciform or pinwheel configuration.

6 Claims, 4 Drawing Sheets

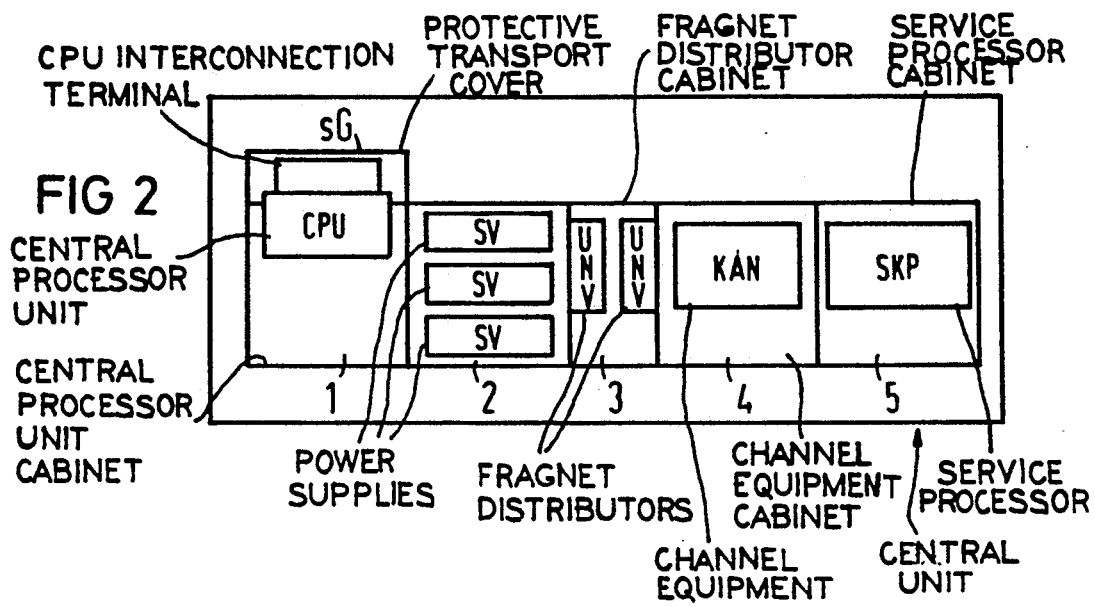
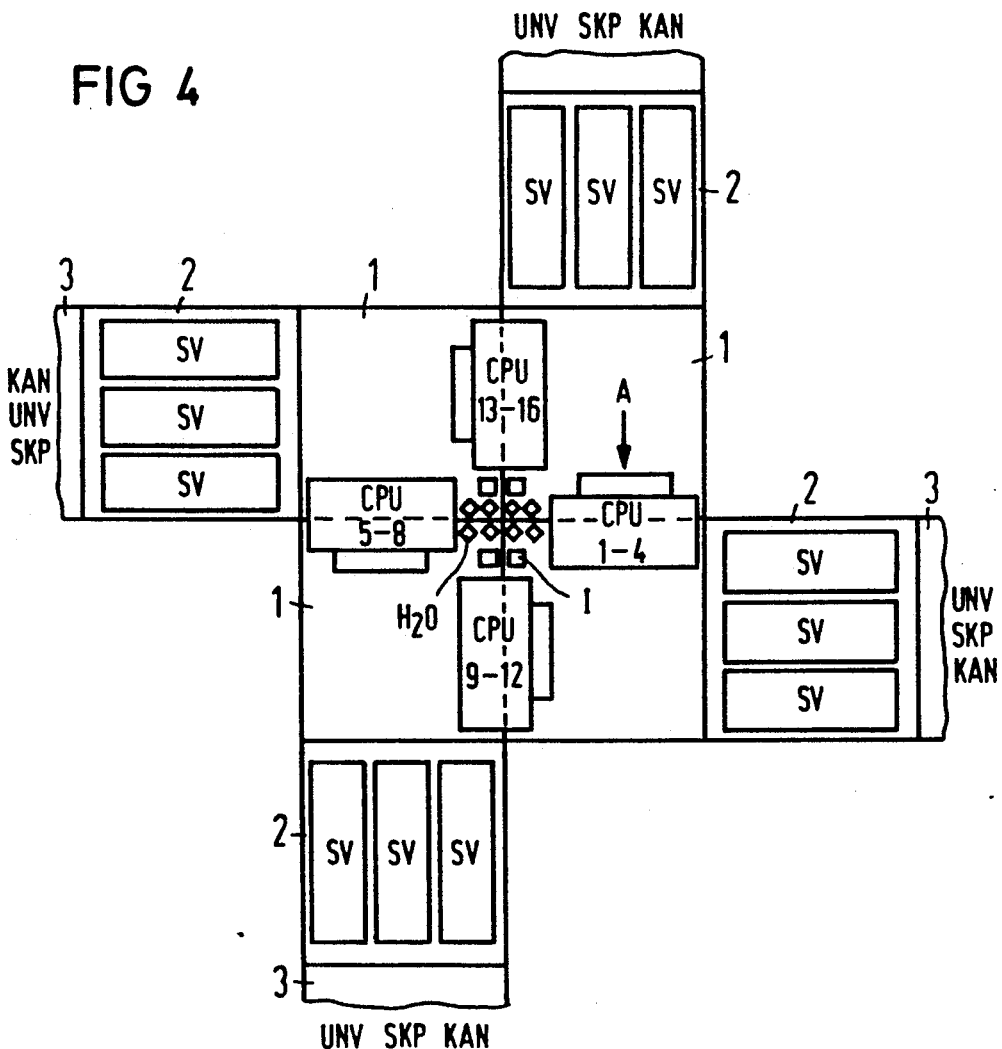

MODULAR MAINFRAME COMPUTER SYSTEM HAVING AN INTERCONNECTION PORTION IN ASSEMBLY WITH A CPU AND EXTENDING FROM A CABINET

BACKGROUND OF THE INVENTION

The present invention generally is directed to modular mainframe computer systems. More particularly, the invention relates to a modular mainframe computer system whose functional units, such as central processor units, power supply units, fragnet distributors, channel equipment and service processors are separately housed in their own cabinets that are configured and interconnected side-by-side in a row to form a central unit.

SUMMARY OF THE INVENTION

The present invention provides an improved modular installation system for mainframe computers. To this end, the invention provides a modular installation system for mainframe computers that is incrementally adaptable, i.e., in steps, to the computing power requirement while keeping the lengths of internal line connections to a minimum.

In an embodiment, the invention provides a modular mainframe computer system having functional units housed within separate rectangular cabinets, the cabinets arranged to form at least one central unit, the central unit comprising a row of interconnected cabinets one end of which comprises a central processor unit cabinet, the central processor unit cabinet housing at least one central processor unit with an interconnecting portion, the central processor unit being positioned within its central processor unit cabinet such that the interconnecting portion thereof projects outwardly from a backside of the cabinet perpendicularly to the row and a free space is provided in an interior portion of the cabinet, the free space being configured to receive therein a projecting interconnecting portion of another central processor unit of another central processor unit cabinet of another central unit.

In an embodiment, two or more central processing units are positioned within the central processor unit cabinet.

In an embodiment, the invention provides that two such central units are positioned along parallel rows with their backsides facing each and their respective central processor unit cabinets positioned proximate each other but diagonally opposite one another.

In an embodiment, the invention provides that at least three such central units are provided with two such central units being positioned along parallel rows with their backsides facing each other and their respective central processor unit cabinets positioned proximate each other but diagonally opposite one another, the third central unit being positioned along a third row perpendicular to the parallel rows and having its central processor unit cabinet substantially adjacent the other two central processor unit cabinets positioned such that the projecting portion of the central processing unit disposed in the third central processor unit cabinet projects into the free space of one of the other two central processor unit cabinets and the projecting interconnecting portion of one of the other two central processing units is received within the free space of the third central processing unit cabinet.

In an embodiment, the invention provides that at least four such central units are provided, the central units being paired along parallel rows with their backsides facing each other and the respective central processor units positioned proximate each other but diagonally opposite one another, the two pairs joined to form a cruciform with the projecting portions of the respective central processor units projecting into the free spaces of adjacent central processor unit cabinets.

The foregoing features provide a modular installation system by means of which an incremental or step-by-step expansion of the central units to fulfill performance requirements is enabled in a simple manner. It can be appreciated that the line lengths of the internal logic connections between the central processor units is considerably reduced in comparison to traditional installations.

These and other features of the invention are set forth in greater detail in the following detailed description of the presently preferred embodiments with reference to the accompanying drawings.

BRIEF DESCRIPTION OF THE DRAWINGS

FIG. 2 illustrates a basic model of the first expansion level of the system of FIG. 1.

FIG. 4 illustrates a modified version of the fully expanded system of FIG. 3.

DETAILED DESCRIPTION OF THE PRESENTLY PREFERRED EMBODIMENTS

Figure 1:
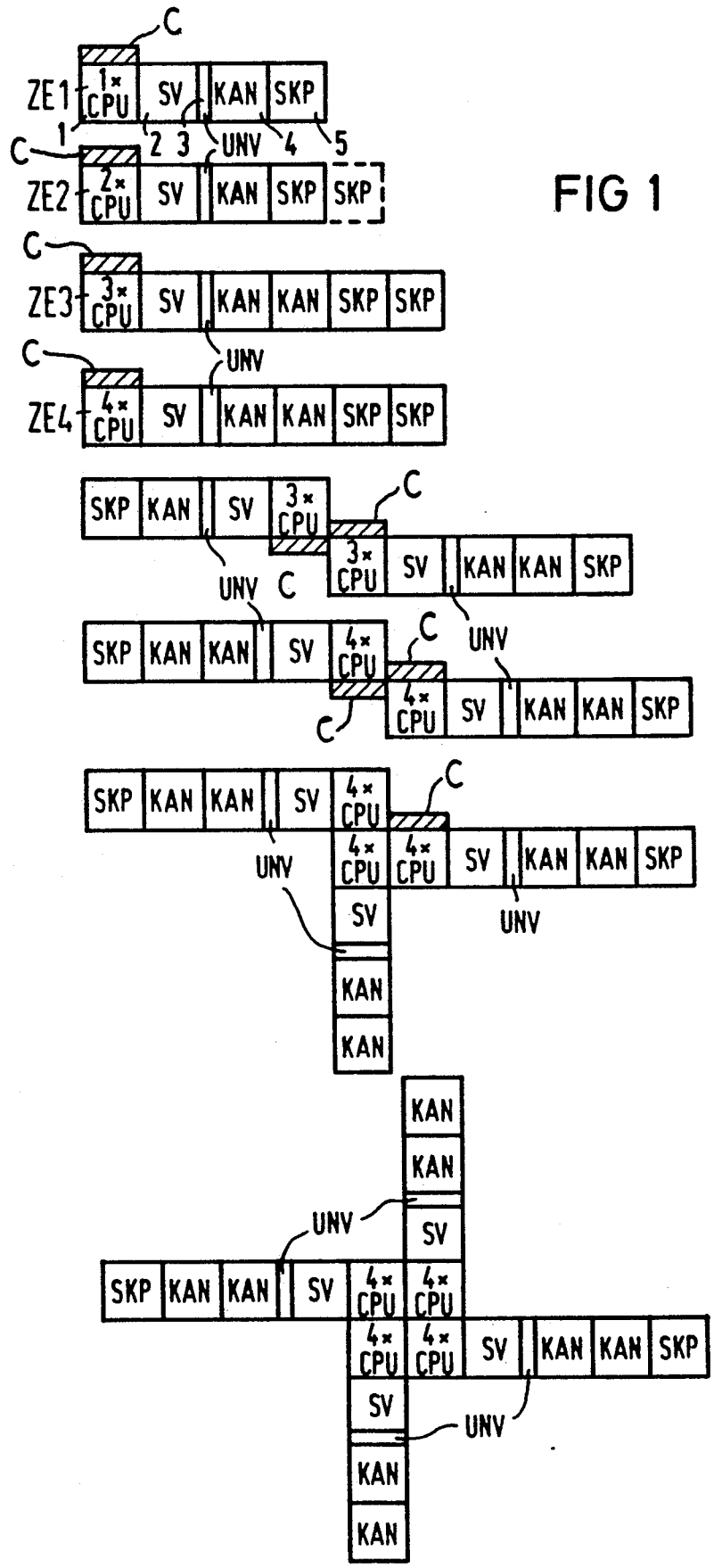
FIG. 1 illustrates an overview of possible expansion levels in a system embodying features of the invention.

FIG. 1 illustrates the various configurations, steps or levels of possible expansion of a mainframe computer system embodying principles of the invention. It can be appreciated that the expansion levels are illustrated in sequence from top to bottom, with the top configuration of FIG. 1 illustrating a basic unexpanded system while the bottom configuration of FIG. 1 illustrates a fully expanded system.

As illustrated, only one cabinet 1 having a central processor unit (CPU) is needed in the first stage or expansion level labelized. Additionally included are a power supply cabinet 2 having control power supply units SV, a cabinet 3 for a fragnet (subnetwork) distributors UNV, a cabinet 4 for channel equipment KAN and a further cabinet 5 for service processors SKP. These five cabinets are interconnected along a row to form a basic form of a central unit.

As can be seen, the CPU includes projecting interconnecting portion or terminal C. The CPU is mounted in the cabinet 1 such that it is positioned toward a backside of the cabinet and the interconnecting portion C projects outwardly from the backside of the cabinet 1 perpendicularly to the row defined by the central unit. Due to this positioning of the CPU, a free space is provided within a front interior portion of the cabinet 1.

In a second stage or expansion level labeled ZE2, a further central processor unit CPU is added to the cabinet 1, for example, mounted above the first CPU and a further service processor cabinet 5 optionally is added, if needed.

In a third level of expansion labeled ZE3, a third central processor unit CPU is added to the central processor unit cabinet 1, and a cabinet 4 for channel equipment KAN can be added, if needed.

In a fourth expansion stage or level labeled ZE4, a fourth central processor unit CPU is added to the cabinet 1, such that the cabinet 1 is fully equipped.

In a fifth stage or level of expansion two central units of these third expansion level ZE3 are positioned on parallel rows such that the control processor unit cabinets 1 are positioned proximate and diagonally opposite one another and with the backsides thereof facing each other. At this expansion level, three central processor units CPU are present in each central processor unit cabinet 1.

In a sixth expansion stage or level, two central units of the fourth expansion stage, i.e., ZE4 are similarly positioned, i.e., in parallel rows with their central processor unit cabinets 1 positioned diagonally opposite one another.

In a seventh stage or expansion level, three central units of the fourth expansion level ZE4 are interconnected to form a partial cruciform. It can be seen that a third central unit has been added to the configuration of the illustrated sixth expansion level such that the third central unit extends perpendicularly relative to the first two central units. The central processor unit cabinets 1 are interconnected such that the interconnecting portions C of two of the cabinets 1 project into and are received within the free spaces of the other two cabinets 1. Essentially, these are right angle interconnections.

In an eighth expansion level or stage, a fourth central unit of the expansion level ZE4 is added to the illustrated seventh level configuration such that a cruciform or pinwheel shape is formed. In this extension level, all of the projecting interconnecting portions C of the various CPU's of each central processor cabinet 1 project into and are received within the adjacent central processor unit cabinet 1 of another perpendicularly oriented central unit.

As a result of the foregoing, it can be seen that it is possible to incrementally increase the number of central processing units as needed from one to sixteen.

In FIG. 2 there is illustrated in greater detail a basic model of the first expansion stage or level ZE1. As illustrated, a central processor unit CPU is positioned toward a back portion of its central processor unit cabinet 1 such that the interconnecting portion C thereof projects beyond the back wall of the cabinet 1. The projecting interconnection portion of the CPU is provided with a protective cover or grating sG for transport that can be removed upon assembly of the mainframe. An interior portion of the front portion of the cabinet 1 thereby is provided with a free space.

As also illustrated, the power supply cabinet 2 in which are positioned three power supplies SV then is positioned in adjoining relationship to the central processor unit cabinet 1 upon assembly of the mainframe. The power supply cabinet 2 is in turn coupled to an adjoining fragnet (subnetwork) distributor cabinet 3 as well as to cabinets 4 and 5 for the channel equipment KAM and for the service processor SKP, respectively.

Figure 3:
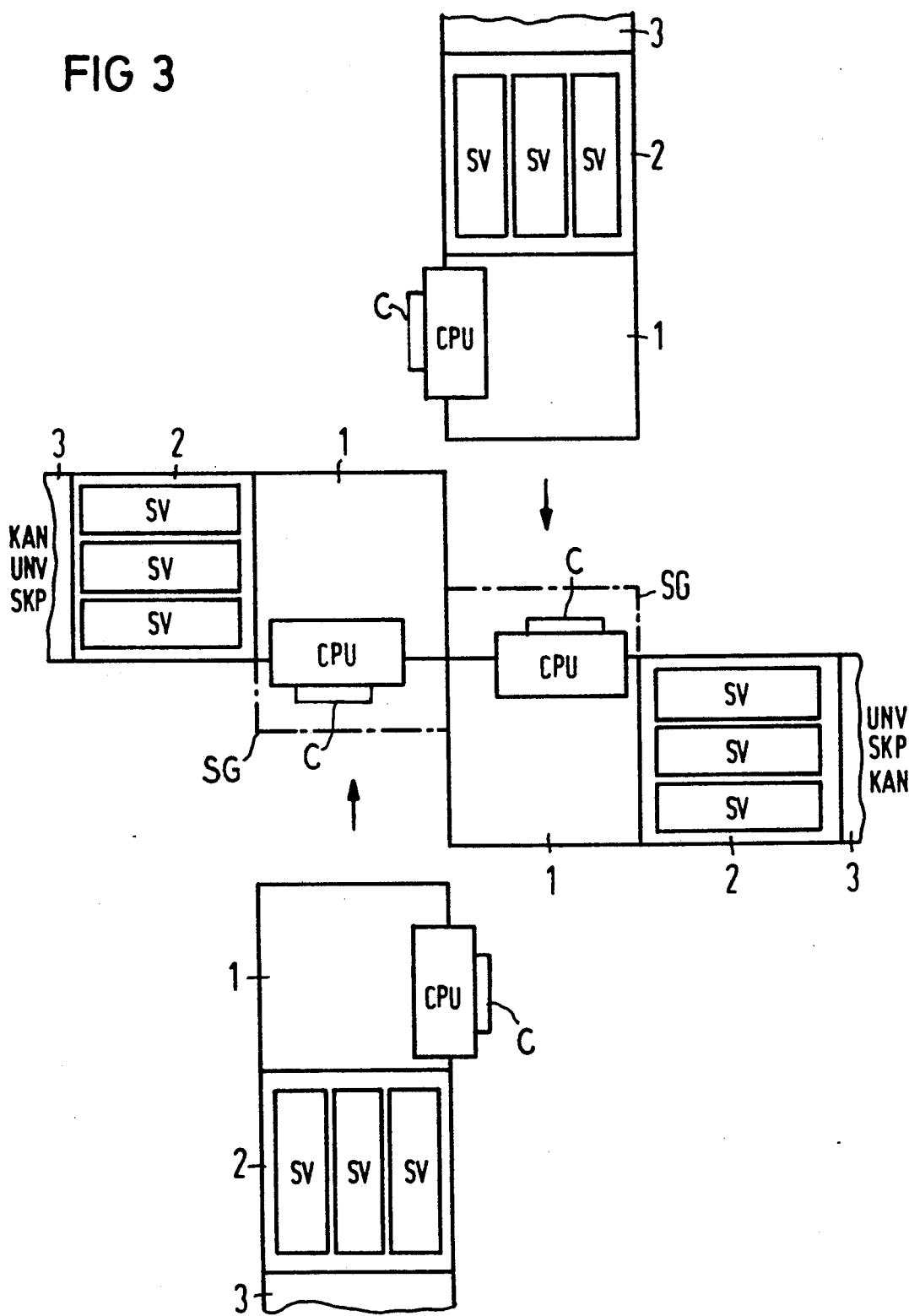
FIG. 3 illustrates a detailed diagram of the central processor unit region of a fully expanded system embodying features of the invention.

The illustration of FIG. 3 illustrates two central units already disposed in their final position in horizontal form and illustrates two further central units of the fourth level, i.e., ZE4 being maneuvered into their positions which are oriented perpendicularly with respect to the first two central units.

In FIG. 4 there is illustrated all four central units ZE4 already in their final installation condition. It can be appreciated that the projecting interconnection parts C of the various central processor units CPU project into the respective free spaces of the neighboring central processing unit cabinets 1. To this end, the protective coverings sG of the cabinets 1 must have been removed. Vertical skeleton sleepers of the two basic models must be removed at the same time.

The illustration of FIG. 4 also illustrates an alternative or modified version of the embodiment of FIG. 3. In the version of FIG. 4, power supplies I for the CPU's and water supplies $H_2O$ for cooling the CPU's are provided at a center of the resulting cruciform configuration, in the area occupied by the central processor unit cabinets 1.

Figure 5:
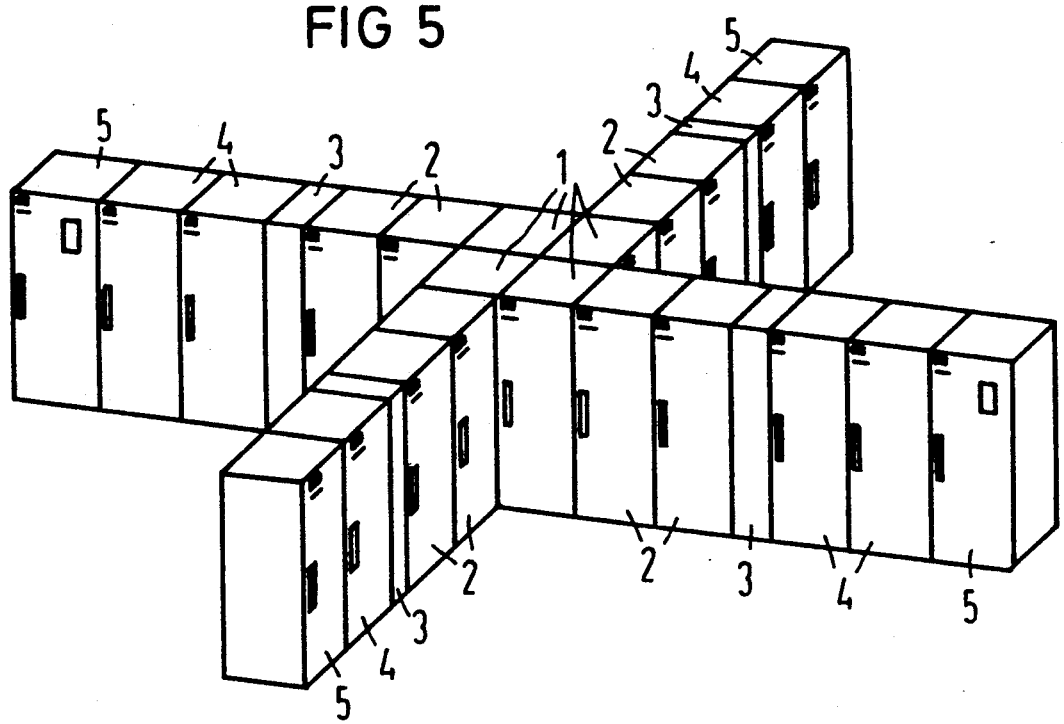
FIG. 5 illustrates in perspective view a fully expanded system embodying features of the invention.

In FIG. 5 there is illustrated in perspective view the full configuration of the cabinets of FIG. 3, wherein the cabinets are arranged in a cruciform, or pinwheel configuration.

While preferred embodiments have been shown, modifications and changes may become apparent to those skilled in the art which shall fall within the spirit and scope of the invention. It is intended that such modifications and changes be covered by the attached claims.

What is claimed is:

1. A modular mainframe computer system having functional units separately housed in respective cabinets aligned in at least one row to form one central unit, the central unit having a central processor unit cabinet at one end of the row in which is housed at least one central processor unit, the central processor unit having an interconnection portion in assembly therewith, the central processor unit being so positioned at the backside of the central processor unit cabinet that the interconnection portion thereof projects outwardly from the central processor unit cabinet perpendicularly to the row thereby leaving a free space within a front interior section of the central processor unit cabinet within which can be received the interconnection portion of another central processor unit of another central unit oriented perpendicularly to the central unit of concern.

2. The modular mainframe computer system of claim 1, wherein two central units are positioned along parallel rows with their backsides facing each and their respective central processor unit cabinets positioned proximate each other but diagonally opposite one another.

3. The modular mainframe computer system of claim 1, wherein at least three such central units are provided with two central units being positioned along parallel rows with their backsides facing each other and their respective central processor unit cabinets positioned proximate each other but diagonally opposite one another, the third central unit being positioned along a third row perpendicular to the parallel rows and having its central processor unit cabinet substantially adjacent the other two central processor unit cabinets positioned such that the interconnection portion of the central processing unit disposed in the third central processor unit cabinet projects into the free space of one of the other two central processor unit cabinets and the interconnection portion of one of the other two central processing units is received within the free space of the third central processing unit cabinet.

4. The modular mainframe computer system of claim 3, wherein a fourth central unit is provided, the four central units being paired along two parallel rows with their backsides facing each other and respective central processor unit cabinets positioned proximate each other but diagonally opposite one another, the two pairs joined to form a cruciform with inner connection portions of the respective central processor units projecting into the free spaces of adjacent central processor unit cabinets.

5. The modular mainframe computer system of claim 1 wherein the cabinets are rectangular.

6. The modular mainframe computer system of claim 1 wherein the central processor unit cabinet is square in a horizontal cross-section.

* * * * *